United States Patent [19]

Wollnik

[11] 4,164,652
[45] Aug. 14, 1979

[54] PROCESS AND ARRANGEMENT FOR REGISTRATION OF ION-, ELECTRON- AND LIGHT-SPECTRA

[75] Inventor: Hermann Wollnik, Fernwald, Fed. Rep. of Germany

[73] Assignee: Varian Mat GmbH, Bremen, Fed. Rep. of Germany

[21] Appl. No.: 922,696

[22] Filed: Jul. 7, 1978

[30] Foreign Application Priority Data

Jul. 9, 1977 [DE] Fed. Rep. of Germany ....... 2731129

[51] Int. Cl.² ............................................. B01D 59/44
[52] U.S. Cl. .................................... 250/281; 250/282; 250/369
[58] Field of Search ......................... 250/281, 282, 369

[56] References Cited

U.S. PATENT DOCUMENTS 3,947,684  3/1976  Ikebe et al. ........................... 250/369

Primary Examiner—Harold A. Dixon
Attorney, Agent, or Firm—Sughrue, Rothwell, Mion, Zinn and Macpeak

[57] ABSTRACT

An improved process and an arrangement for the registration of ion-, electron- or light-spectra are described. The spectrum is guided continuously or in very small steps past an N-channel detector. After or during the time in which the spectrum shifts, all N-channels are read out. The N-channel information is added to the information in N corresponding digital or analog storage elements. Simultaneously to the shift of the spectrum past the N-channel detector or, subsequently, the information in the N storage elements are shifted one position. Thus, during the next cycle of detection, read out and addition, the information detected corresponding to a specific part of the spectrum is being added to information obtained in prior cycles from the same part of the spectrum. If this process is repeated as long as the continuous shifting of the spectrum lasts, an intensity will be registered successively in all N-channels, and then summed in the storage, corresponding to that which would be obtained if the spectrum was shifted past a gap of the width of a single channel. This sum increases at each shifting process until after N shifting the sum in an outlet register finally corresponds to the intensity integrated over N measuring cycles. Reading out the outlet register corresponds for the further data processing precisely to that of a single outlet gap so that existing data processing systems for particle or light spectrometers do not require modification for use in case of the improved registering arrangement.

12 Claims, 5 Drawing Figures

PROCESS AND ARRANGEMENT FOR REGISTRATION OF ION-, ELECTRON- AND LIGHT-SPECTRA

BACKGROUND OF THE INVENTION

Particle or light spectographs are devices where particles of different mass energy or charge, or light of different wavelength, are separated physically from one another so that the locally fixed intensity distribution of the spectrum may be registered. A particle or light spectrometer differs from a spectrograph in that through systematic shifting of the dispersion elements, the spectrum is guided past a narrow detection gap. The time fluctuations of intensity seen in the gap produces the same spectrum which would be registered simultaneously in a spectrograph.

Whereas, in a spectrograph, in principle, all particles entering into the device are registered in the plane of registration with a photographic plate, in a spectrometer, only a small percentage of the total intensity is used. Nevertheless, generally, the spectrometer is preferred to the spectrograph since further data processing may take place directly and the length of the registrable spectrum may in most cases be larger.

For some time, attempts were made to determine the data directly in a mass spectrograph by allowing the individual bundles of ions of a spectrum to strike a long scintillation screen in the image-plane of the spectrograph. The distribution of light intensity developing then was viewed with a television (TV) camera where the scanning lines were parallel to the lines of the mass spectrum. The distribution of intensity from one spectrum is registered in a multi-channel analyzer. In this way, the registration of the spectrum may be extended over many cycles of TV pictures, and thus, the same signal/noise ratio may be achieved as in a correspondingly long exposure time of a photographic plate.

The disadvantage in case of these known processes consists in the fact that, similarly, as in photoplate registration, only a certain part of the total spectrum may be registered or the total spectrum must be subdivided into certain pieces, which leads to difficulties at the points of intersection, and that various parts of the spectrum are possibly registered with different sensitivity.

SUMMARY OF THE INVENTION

The present invention proposes a process for the registration of the spectrum of light, electrons or ions, which spectrum is guided past a detector device continuously or in small steps. A series of N registration elements, disposed side by side, is used as a detector device. The information detected by the N registration elements are always interrogated whenever the spectrum has shifted by the width of a registering element. The information, after each shifting process, is summed in N respective storage elements. Subsequently, the content of the $i^{th}$ storage element is transferred into the $(i + 1)$ storage element. The cycle is repeated. After N cycles or steps, the $(N + 1)$th storage element will contain the sum of the information sum N registration cycles of a single part of the spectrum. The information may be read out conventionally.

The arrangement of the invention for the registration of the spectrum of a light, electron or ion spectrum emcompasses a detector device as well as means which guide the spectrum past the detector device continuously or in small steps. It is characterized in that the detector device contains a multiplicity of N registering elements, disposed side by side. Furthermore, there are means which interrogate the information of N registering elements whenever the spectrum has shifted by the width of one registering element. Furthermore, N storage elements are provided on which this information of the N registering elements are summed. There are means which transfer the content of the ith storage element to the $(i + 1)$th storage element. An $(N + 1)$th storage element is provided from which, after N registration cycles, the sum of the information of a certain place of the spectrum may be read out.

It is an object of the invention to create a process and an arrangement for the registration of spectra, and which combines the advantages of spectrographs and spectrometers.

Another object of the invention is to provide such a process and arrangement which permits automatic computer interpretation.

A further object of the invention is to provide a process and arrangement for the registration of spectra with improved signal-to-noise ratio.

A further object of the invention is to provide a process and arrangement for the registration of spectra of great length.

Another object of the invention is to provide a process and arrangement for the registration of spectra where no difficulties develop at places of intersection of subsections of the spectrum.

A further object of the invention is to provide a process and arrangement for the registration of spectra where variable sensitivities of the individual registering element will not lead to invalidation of the result of measurement.

BRIEF DESCRIPTION OF THE DRAWINGS

Further objects, advantages and characteristics of the invention will be apparent from the subsequent description of preferred embodiments on the basis of the following drawings.

DESCRIPTION OF THE PREFERRED EMBODIMENTS

In FIG. 1a, several bundles of rays $F_1$ to $F_3$ are shown. For purposes of the subsequent description, let us assume that these are bundles of ions. Naturally, however, these could also be electron or photon bundles. The individual bundles $F_1$ and $F_3$ come from a dispersing element (not shown), for example, from a magnetic and/or electric field in which fission according to specific masses has taken place in a manner known to one of ordinary skill in the art.

The bundles $F_1$ to $F_3$ strike an elongated scintillation screen 10 where the intensity of the particles of the individual bundles is converted into a corresponding light intensity. These processes are known to anyone of ordinary skill in the art and need not be described in more detail here.

The light pattern developing on the scintillation screen 10 is observed with the help of a TV camera (not shown) which is oriented such that its scanning lines 12 are parallel to the bundles $F_1$ to $F_3$. FIG. 1b shows a TV screen 11 which reproduces the picture taken by the TV camera.

The portion of the spectrum shown as including $F_1$ through $F_3$ is a part of the total spectrum. It is assumed that the total spectrum is shifted an amount equivalent to a single scanning line of the TV screen, i.e., equivalent to the width of a single one of the N detectors, once each measurement cycle. Consequently, during the next measurement cycle, the ion intensity corresponding to spectrum portions $F_1$, $F_2$ and $F_3$ will have shifted one scanning line. The spectrum shifting is itself conventional and may be in discrete steps or continuously.

FIG. 1c finally shows the electric analog signals which develop by integration of the intensity of the individial scanning lines 12 over their length. The N lines of the TV pictures thus contain the analog informaton $A_1$ to $A_N$ which correspond to the spectrum taken with N channels. Every scanning line 12 of the TV picture thus corresponds to a registering or storage element.

Figure 1:
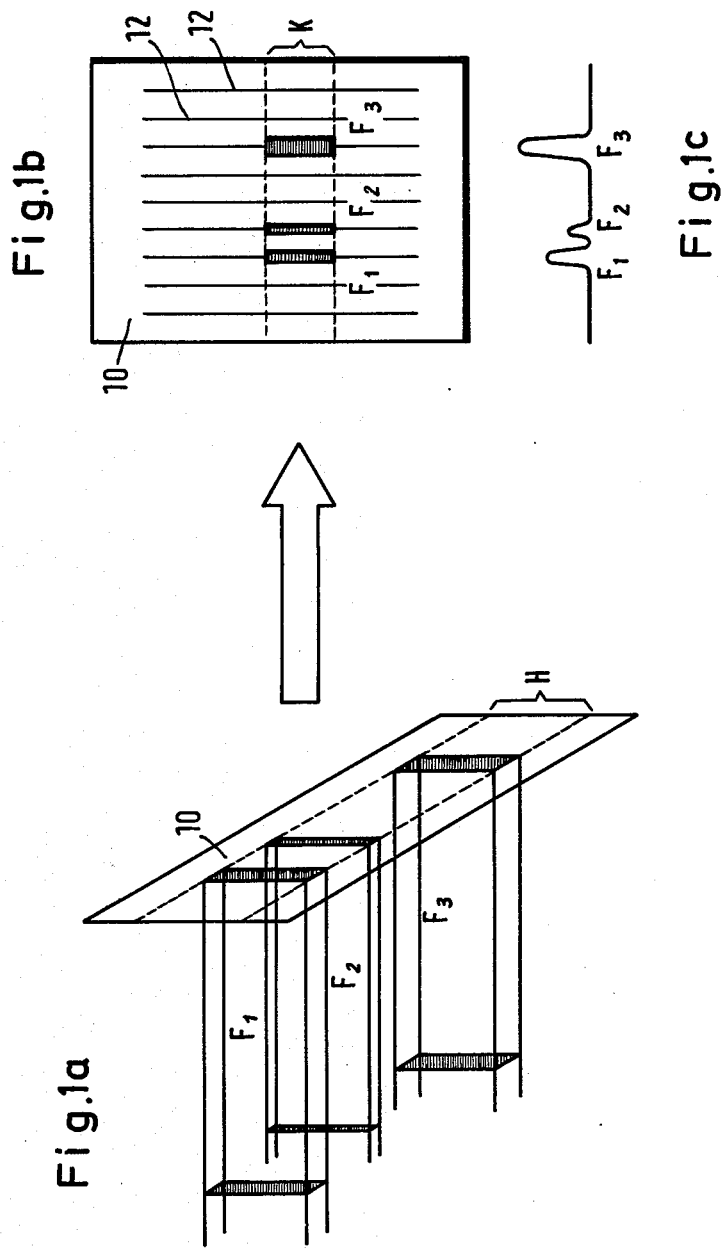
FIG. 1a shows schematically various ion bundles of a mass spectrograph which strike a scintillation screen.
FIG. 1b shows the corresponding picture taken by a TV camera.
FIG. 1c shows schematically the distribution of intensity of the ion bundles shown in FIG. 1.
Figure 2:
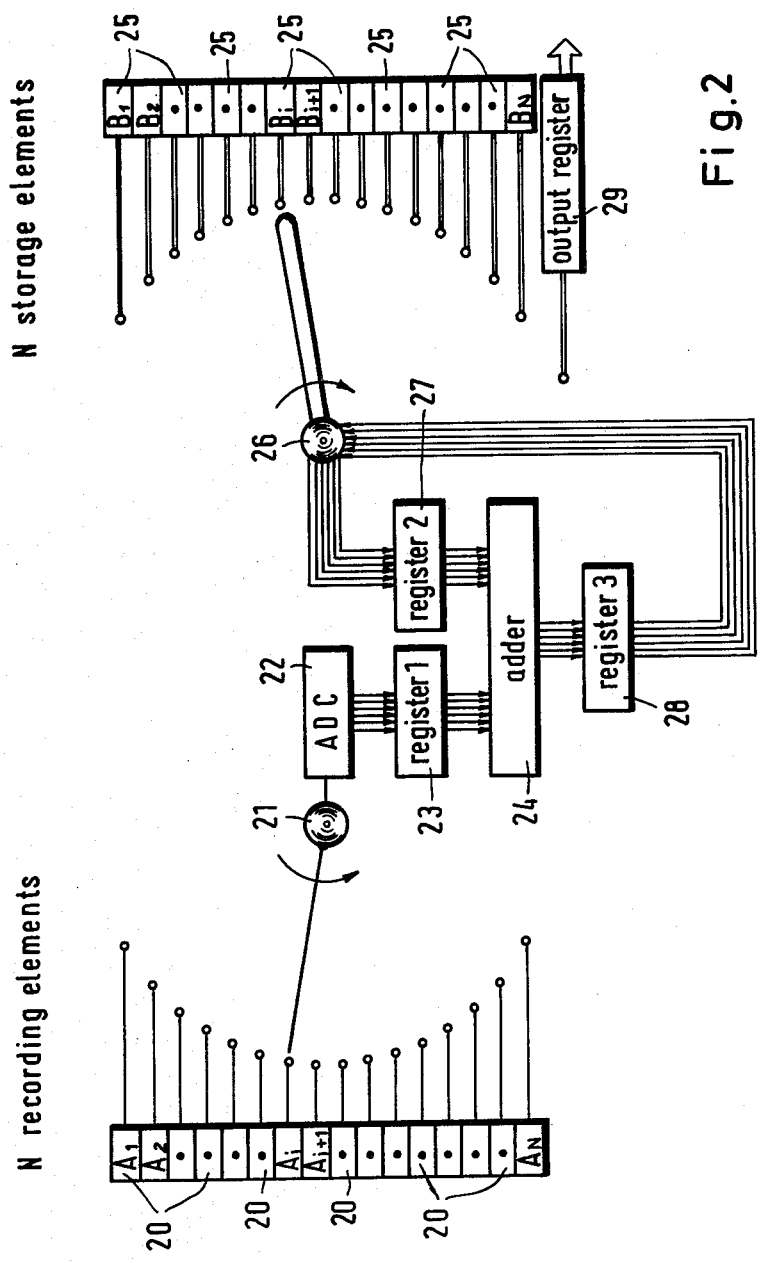
FIG. 2 shows schematically a block switching diagram of a switching arrangement for a first embodiment of the invention.

A first embodiment for a switching arrangement for the interpretation of the signals as in FIG. 1c is shown in FIG. 2.

The N registering elements 20, which contain the analog information $A_1$ to $A_N$ and may be identical, for example, with the above-mentioned scanning lines 12, are selectively connected via a cyclically operated addressing switch 21 with an analog-to-digital converter (ADC) 22. The addressing switch 21 is stepped through N + 1 steps to connect registering elements $A_1$ through $A_N$ successively to ADC 22. On the (N + 1)th step, nothing is connected to the ADC 22. On the next step, switch 21 is connected back to element $A_1$. The N + 1 steps constitute a cycle, and the timing is such that during a cycle (for continuous movement) or at the end of a cycle (for discrete stepped movement), the spectrum is shifted an amount corresponding to the distance between adjacent registering elements 20. The outlet of the ADC 22 is connected with the inlet of a first register 23 and its outlet in turn with an inlet of an adder 24.

The switching apparatus moreover contains N storage elements 25, the digital storage contents of which are designated $B_1$ to $B_N$. The storage elements 25 may connect via a cyclically operated addressing switch 26 with the inlet of a second register 27, the outlet of which is in connection with a second inlet of the above-mentioned adder 24. Switch 27 is stepped synchronously with the stepping of switch 21. Note that at step N + 1, switch 26 is connected to an output register 29.

The output signal of the adder stage 24 is put in a third register 28. The contents of the third register 28 may be fed back via the selection switch 26 into the storage elements 25 or be put into a special outlet register 29.

The switch described is timed in a manner known in the art such that the following function results.

The spectrum that is to be investigated is shifted continuously or in very small steps. During the time in which the spectrum moves the equivalent of one registering element, all N register elements 20 are read out. The analog informations $A_1$ to $A_N$ are added in the subsequently described manner to the contents $B_1$ to $B_N$ of the storage elements 25. At the same time or subsequently, by exchanging every Bith content with every B(i + 1)th content, the entire spectrum, as represented by the sums in storage elements 25, is shifted by a storage element 25. The first storage element 25, therefore, always has the content $B_1 = 0$. The content $B_N$ of the Nth storage element 25 is shifted to the output register 29, which is read out by a data receiving station (not shown).

Whenever this process is repeated as long as the continuous shifting of the spectrum continues, then an intensity will be registered successively in all N scanning lines 12 serving as register elements 20, and is added up in the storage elements 25, which corresponds to the intensity, which would be found behind a gap of the width of a scanning line 12. This value grows at each shifting. After N shiftings or cycles, the content of the output register 29 corresponds to the intensity integrated over N measuring cycles. The signal read-out of the register 29 corresponds exactly to that of an individual outlet gap for the further data processing so that a data processing system usable for a spectrometer may be used.

Each step of the N cycles may be subdivided into three phases or beats. In this case, let us assume that the register 28 is set at 0 to start with.

In case of a selected ith step in the first beat, the analog value $A_i$ of the ith registering element 20 is fed to the ADC 22 and the corresponding digital number is fed into the first register 23. Simultaneously, the content $B_i$ of the ith storage element 25 is fed into the second register 27.

In the second beat, the content of the third register 28, which, at this instant, is $A_i - 1 + B_i - 1$, is guided into the ith storage element 25. The third register 28, as a result, will be free for the reception of new information.

In the third beat of i-step, the contents of the first register 23 and of the second register 27 are added in the adding step 24; the sum is transferred into the third register 28.

After N such steps, the sum of the last content of the Nth storage element 25 and of the Nth registering element 20 stands in the third register 28. This value corresponds to the sum of the intensity of one part of the spectrum of N successive measuring cycles. After the next step of switch 26, the content of register 28 is transferred into the outlet register 29 and is read out from there, as described.

Figure 3:
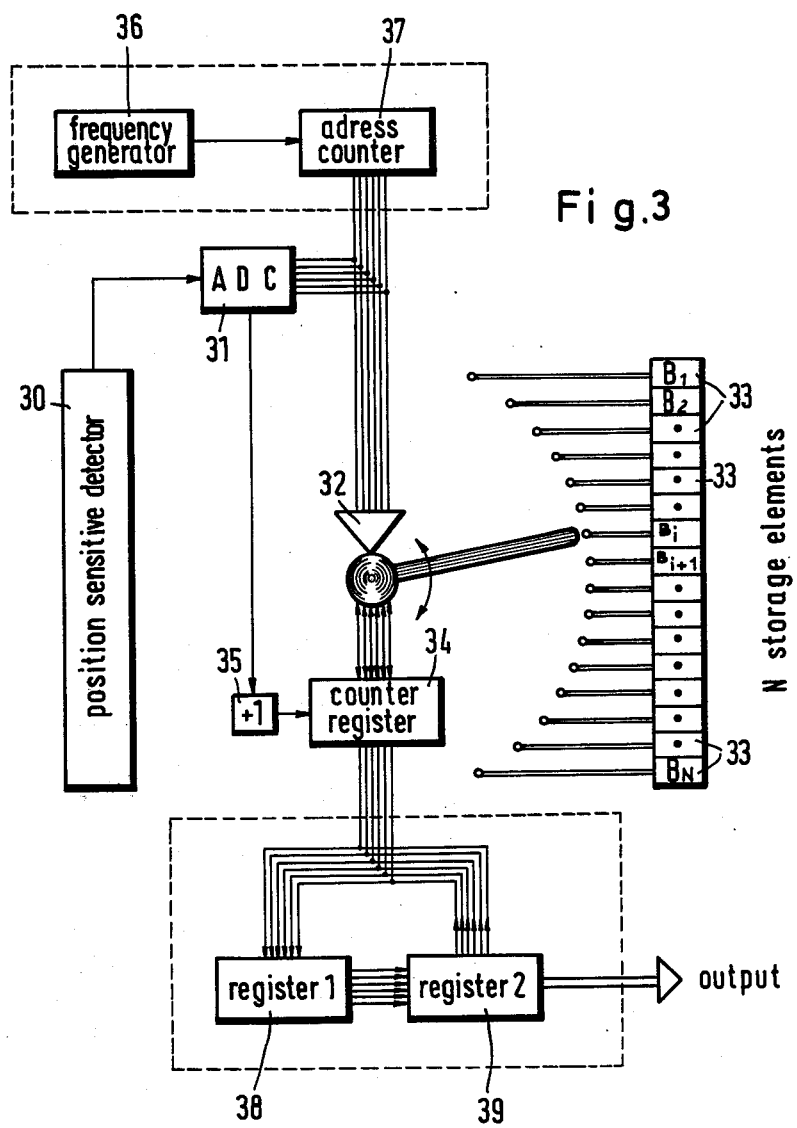
FIG. 3 is a schematic block diagram of a circuit arrangement for a second embodiment of the invention.

A second embodiment of the switching arrangement of the invention is similar to a classical multi-channel analyzer and is shown in FIG. 3.

The detector 30 delivers a position-dependent analog signal for every striking particle, be that an ion, electron or photon. The latter is fed to an ADC 31. The latter produces a digital starting signal which is fed as an address signal to an addressing arrangement 32. The addressing arrangement 32 connects one of N storage elements 33 with a counter register 34, depending on the address signal.

The ADC 31, moreover, is connected with a unit generator 35. The latter always adds a count of 1 to the content of register 34 whenever the ADC 31 produces an address signal, and the content of the corresponding storage element 33 is located in the counter register 34. Then, the content of the counter register is again returned into the corresponding storage element 33.

After some time Δat, which corresponds to the shifting of the spectrum by 1/Nth of the length of the locally dependent detector, the shifting of the contents of the storage element 33, already described farther above on the basis of FIG. 2, will take place.

For this purpose, a frequency generator 36 acts upon an address register 37. This counts from i = 1 to i = N and, at the same time, controls the transfer of the content Bi of the i storage element 33 into the (i + 1) storage element 33.

For this purpose, the outlet of the counter register 34 is connected with a first register 38 and its outlet with a second register 39. The latter, for one thing, may be interrogated by a data receiving station (not shown). For another thing, an outlet of the second register 29 is connected back with the counter register 34.

The ith shifting step, in case of which the address register 37 has selected the ith storage element via the addressing arrangement 32, is accomplished as follows.

First, the content $B_i$ of the i-storage element 33 is transferred into the first register 38 (the latter may also be identical with the counter register 34). Then, the content of the second register 39 is fed into the i-storage element 33. Finally, the content of the first register 38 is put into the second register 39.

Every shifting cycle contains, as mentioned, N such steps. In the last time units, at the same time, a digital number becomes available for further data reception in the second register 39, which corresponds to the collected intensity of a place in the spectrum. Instead of registering a certain intensity with a single gap, one may thus count according to the invention with an N-times higher intensity. It is important that variable measuring sensitivities of the individual registering elements are of no account because, indeed, every part area of the spectrum had been registered in all registering elements for one time beat.

In detail and as described, the ions may be allowed to strike a scintillation screen and register the photons with a conventional TV camera, whereby corresponding to the length H of the spectral lines, only a part K of the scanning line is used (cf. FIG. 1). By shooting the ions onto a metal plate instead of the scintillation screen, and by the secondary electron formation caused thereby, the ion spectrum may also be converted into an electron spectrum. Instead of a classical TV camera, one may also use a modern solid-state TV camera or a photo-diode line with a series of photo-diodes, about 10–20 my wide and 50–1000 my long, and disposed side by side. In the latter case, the integration of the intensity across the length of a line is omitted. In case of solid-state TV cameras or diode lines, the ions or electrons may also be shot into the sensitive layers, whereby any conversion of the ion or electron spectrum into a light intensity distribution is abandoned. Should the distance, which is given by the width of a TV line or by the width of the diodes of a diode line, be too great or too small as compared with the line density of the spectrum, then the spectrum may be enlarged or reduced as to particles or light optically.

What is claimed is:

1. A method for obtaining data representing the intensity spectrum of a light, electron or ion spectrum comprising:
    moving the spectrum past a detector arrangement of N side-by-side detectors $A_1$ through $A_N$, whereby each said detectors registers a content dependent upon the part of the spectrum at a corresponding position;
    reading the contents of all said detectors once each period corresponding to the period said spectrum moves the width of one of said side-by-side detectors; and
    adding the content read from each detector $A_i$ with the contents read from $A_{i-1}$ through $A_1$ during the previous i − 1 periods, respectively, to obtain summation over N periods of each spectrum part of a width equal to the detector width.

2. The method of claim 1 wherein the step of adding comprises, during each period, adding the content of each detector $A_i$ to the content of a corresponding storage register $B_i$ and placing the sum $A_i + B_i$ into the storage register $B_{i+1}$, whereby the sum $A_N + B_N$ is placed in an output storage register and represents the intensity of one part of said spectrum.

3. Apparatus for obtaining data representing the spectrum intensity of a light, electron or ion spectrum which is caused to move past a detector, said apparatus comprising:
    a detector comprising N individual side-by-side detector elements, each for detecting that part of said spectrum at a position corresponding to the position of said detector element and providing N items of detected information $A_1 - A_N$, respectively;
    means for reading the information detected by all said detector elements once each period, said period corresponding to the movement of said spectrum an amount such that each spectrum part moves from a position corresponding to one detector element to a position corresponding to an adjacent detector element;
    N storage elements $B_1 - B_N$ for storing N items of information, respectively; and
    means for adding, during each period, all detected information $A_i$ to all corresponding stored information $B_i$ and storing the resulting sum in said storage element $B_{i+1}$, whereby the sum of $A_N + B_N$ represents output information of the intensity of a part of said spectrum.

4. Apparatus as in claim 3 characterized in that the detector elements comprise the scanning lines of a TV camera.

5. Apparatus as in claim 3 characterized in that the detector elements are light-, electron- or ion-sensitive photo-diodes.

6. Apparatus as claimed in claim 3 wherein said storage elements are digital storage elements.

7. Apparatus as claimed in claim 3 wherein said means for reading comprises first register means for storing information applied thereto, and first switching means for successively connecting, during N steps of each period, said detector elements to said first register, whereby said informations $A_1$ through $A_N$ is successively stored in said first register during steps 1 through N, respectively.

8. Apparatus as claimed in claim 7 wherein said means for adding and storing comprises:
    second and third register means for storing information applied thereto; and
    adder means having inputs from said first and second registers and an output connected to the input of said third register, and second switch means operating synchronously with said first switch means for connecting the input to said second register and the output from said third register to said storage elements $B_1$ through $B_N$ during the N successive steps of said period.

9. Apparatus as claimed in claim 8 further comprising an analog-to-digital converted connected between the outputs of said first switching means and the input of said first register.

10. Apparatus as in claim 3 further comprising an ion, electron or light optical enlarging or reducing system positioned between said spectrum and said detecting elements.

11. Apparatus as in claim 3 further comprising a metal layer for converting the ion spectrum by secondary electron emission into an electron spectrum, said metal layer placed in front of said detectors.

12. Apparatus as in claim 3 further comprising a scintillation screen for converting the ion or electron spectrum into a light spectrum, said scintillation screen being placed in front of said detectors.

* * * * *